United States Patent [19]

Nozokido et al.

[11] Patent Number: 5,750,600
[45] Date of Patent: May 12, 1998

[54] NONFLAMMABLE OLEFIN THERMOPLASTIC ELASTOMER COMPOSITION FOR USE IN SKINS OF INTERIOR AUTOMOTIVE TRIM AND LAMINATE SHEET MADE THEREFROM

[75] Inventors: Yutaka Nozokido; Shinichi Akitaya, both of Ichihara; Akinori Arai; Toyokazu Nakauchi, both of Tsuchiura, all of Japan

[73] Assignees: Chisso Corporation, Osaka; Lonseal Corporation, Tokyo, both of Japan

[21] Appl. No.: 748,905

[22] Filed: Nov. 15, 1996

[30] Foreign Application Priority Data

Nov. 17, 1995 [JP] Japan ................. 7-323868

[51] Int. Cl.$^6$ .................................. C08K 5/3492
[52] U.S. Cl. .................. 524/100; 524/416; 524/490
[58] Field of Search .................. 524/415, 416, 524/414, 100, 490; 428/516, 517; 525/232, 240

[56] References Cited

U.S. PATENT DOCUMENTS

| | | | |
|---|---|---|---|
| 4,132,698 | 1/1979 | Gessler et al. | 524/416 |
| 4,154,718 | 5/1979 | Miyata et al. . | |
| 4,263,186 | 4/1981 | Blüemel | 524/490 |
| 4,396,730 | 8/1983 | Imahasi . | |
| 4,504,610 | 3/1985 | Fontanelli et al. . | |
| 4,615,831 | 10/1986 | Kanno et al. . | |
| 4,745,149 | 5/1988 | Eisele et al. | 524/505 |
| 4,966,931 | 10/1990 | Akitaya et al. . | |
| 5,130,357 | 7/1992 | Akitaya et al. . | |
| 5,213,783 | 5/1993 | Fukumura et al. . | |
| 5,223,560 | 6/1993 | Cipolli et al. | 524/416 |
| 5,314,938 | 5/1994 | Cipolli et al. | 524/416 |
| 5,430,080 | 7/1995 | Iwata et al. | 524/100 |

FOREIGN PATENT DOCUMENTS

| | | |
|---|---|---|
| 0391336 | 10/1990 | European Pat. Off. . |
| 614936 | 9/1994 | European Pat. Off. . |
| 53-92855 | 8/1978 | Japan . |
| 54-77658 | 6/1979 | Japan . |
| 56-26954 | 3/1981 | Japan . |
| 58-141224 | 8/1983 | Japan . |
| 5331322 | 12/1993 | Japan . |
| 6136205 | 5/1994 | Japan . |

OTHER PUBLICATIONS translated Abstract of JP 05-331322, Chisso Corp., No. XP002048226, Database WPI, Derwent Publications, Ltd. 14 Dec. 1993.

translated Abstract of JP 2301434, Hitachi Cable, Ltd., No. XP002048243, Database WPI Derwent Publications, Ltd. 13 Dec. 1990.

*Primary Examiner*—Veronica P. Hoke
*Attorney, Agent, or Firm*—Leydig, Voit & Mayer, Ltd.

[57] ABSTRACT

A nonflammable olefin thermoplastic elastomer composition (F) for use in skins of interior automotive trim, which comprises an oil-extended olefin thermoplastic elastomer composition (G), melamine-coated ammonium polyphosphate (h), a specified 1,3,5-triazine derivative, and a lubricant (f), wherein the composition (G) comprises an olefin thermoplastic elastomer composition (D) and a mineral oil (e), the composition (D) comprising 50 to 70% by weight of an ethylene/α-olefin copolymer elastomer (A) having a Mooney viscosity (ML1+4(100° C.)) of 40 to 100, 35 to 21% by weight of a polypropylene resin (B) having a crystal melting point of 140° to 165° C. and an ethylene unit content of 1 to 2% by weight and 15 to 9% by weight of a low-density polyethylene resin (C) having a density of 0.90 to 0.93 g/cm$^3$ and a crystal melting point of 102°–118° C.

20 Claims, No Drawings

NONFLAMMABLE OLEFIN THERMOPLASTIC ELASTOMER COMPOSITION FOR USE IN SKINS OF INTERIOR AUTOMOTIVE TRIM AND LAMINATE SHEET MADE THEREFROM

FIELD OF THE INVENTION

The present invention relates to a nonflammable olefin thermoplastic elastomer composition for use in skins of interior automotive trim and a laminate made therefrom. More particularly, the present invention is concerned with a nonflammable olefin thermoplastic elastomer composition for use in skins of interior automotive trim which exhibits excellent primary formability in calendering and postformability, for example, in embossing and vacuum and pressure formings, and produces shaped items having flexibility and flame resistance suited for use in interior automotive trims and from which the generation of corrosive and toxic gases attributed to thermal decomposition in fire, etc. is extremely slight as compared with that of the composition containing a halogenous flame retarder and is concerned with a laminate made therefrom.

BACKGROUND OF THE INVENTION

Polyvinyl chloride resins (PVC) have widely been utilized as skin sheets of interior automotive trim. However, they still have problems with respect to, for example, the weight reduction and recyclability. Thus, recently, olefin resins (PO) which are not only flexible and lightweight but also has less problem with respect to the recyclability are increasingly employed as skin sheets of interior automotive trim in place of the above polyvinyl chloride resins.

On the other hand, in recent years, the demand for the flame resistance of interior automotive trims is being increased in accordance with the situation of automobile industry placing top priority on safety. Now, the skin sheets of interior automotive trim made from olefin resins are required to possess high flame resistance as specified in U.S. Federal Motor Vehicle Safety Standards FMVSS 302 (hereinafter may be referred to as "FMVSS").

The mainstream of the recent technology for the flame retardation of olefin resins consists of blending a halogenous flame retarder and antimony trioxide with the olefin resin. However, this technology has a drawback in that toxic and corrosive halogenous gases are generated at the time of combustion or molding.

Instead, the technology comprising blending a nonhalogenous flame retarder with the olefin resin has been proposed as a way for overcoming the above drawback.

For example, the technology using a hydrous inorganic compound (e.g., magnesium hydroxide, aluminum hydroxide or hydrotalcite) as the nonhalogenous flame retarder was proposed in Japanese Patent Laid-open Publication Nos. 53(1978)-92855, 54(1979)-29350, 54(1979)-77658, 56(1981)-26954, 57(1982)-87462 or 60(1985)-110738.

However, this technology can satisfy the requirements specified in FMVSS only when a large amount of the hydrous inorganic compound is blended with the olefin resin. As a result, problems are encountered that not only are compositions having poor moldability obtained but also the sheets made therefrom cannot satisfy the weight reduction required for the interior automotive trim sheets.

Further, a method in which ammonium polyphosphate and a triazine derivative are blended with a thermoplastic resin or a polypropylene resin has been proposed (see, for example, Japanese Patent Laid-open Publication Nos. 59(1984)-147050, 1(1989)-193347 and 2(1990)-263851). The composition obtained by this method has advantages in that not only is the moldability thereof relatively good but also the generation of toxic and corrosive gases is slight at the time of molding or combustion. However, the sheet prepared from the above composition still leaves room for improvement flexibility properties when the use as an interior automotive trim is intended.

For attaining the improvement of the flexibility of the sheet obtained by molding the olefin resin-based composition, the inventors proposed a nonflammable composition which comprised an olefin thermoplastic elastomer, ammonium polyphosphate and a triazine derivative and had not only excellent moldability (injection and extrusion moldabilities) but also high flame resistance and flexibility (see Japanese Patent Laid-open Publication No. 5(1993)-331322).

However, it has been found that, although having excellent moldability, flame resistance and flexibility as mentioned above, this nonflammable composition leaves room for improvement in the sheet formability in calendering and the workability in vacuum forming.

Illustratively, the sheeting of an olefin thermoplastic elastomer for obtaining skins of interior automotive trim is generally conducted by calendering or T-die extrusion. In particular, the calendering ensures very high yield and hence increases the productivity of other molding and working techniques.

When an olefin thermoplastic elastomer is used as a substitute for an polyvinyl chloride resin, it is required that the forming of the olefin thermoplastic elastomer be performed by a production line which was used in sheeting the polyvinyl chloride resin in order to avoid the need to purchase new molding machines and peripheral equipment.

However, it has been found that, when it is intended to sheet the above nonflammable olefin thermoplastic elastomer composition by calendering while winding the composition materials around calender rolls to effect kneading thereof, the composition to be sheeted by holding between parallel rolls, forms a bank (pool of resin) just before the holding by the rolls. Bank forming materials tend to remain without being uniformly kneaded. This bank causes the problems such that the phenomenon commonly known as "tonguing" occurs in which the bank is brought up, as it is, and sticks to the calender rolls to thereby lower the product yield.

Moreover, it has been found that this nonflammable olefin thermoplastic elastomer composition leaves the problem that it is likely to suffer from breakage of postformed article attributed to poor drawability at the vacuum forming operation subsequent to the calendering.

Examples of olefin elastomer compositions having been proposed which ensure excellent calendering primary formability include:

a thermoplastic elastomer obtained by dynamic heat treatment of a blend comprising an ethylene/α-olefin copolymer elastomer, a polypropylene resin and a mineral oil softener in the presence of an organic peroxide and a thermoplastic elastomer composition obtained by blending a polyethylene resin with the above thermoplastic elastomer (see Japanese Patent Publication No. 2(1990)-37942);

and a partially crosslinked thermoplastic elastomer comprising a polyolefin resin and an α-olefin copolymer elastomer being excellent in calendering formability and vacuum forming workability and a thermoplastic elastomer composition comprising the partially crosslinked thermoplastic elastomer comprising a polyolefin resin and an α-olefin copolymer elastomer (see Japanese Patent Laid-open Publication No. 6(1994)-136205).

However, the inventors' experiments have showed that, although it is recognized that compositions obtained by blending the above olefin thermoplastic elastomer with the above ammonium polyphosphate and triazine derivative certainly satisfy calendering workability at specific points within the range disclosed in the above literature, the simultaneously needed vacuum formability (postformability) cannot be satisfied, that is, the compositions have the problem that breakage of postformed article is encountered because of poor sheet drawability at the time of vacuum forming of the compositions into a sheet.

OBJECT OF THE INVENTION

The present invention has been made in order to solve the above problems of the prior art. Thus, the object of the present invention is to provide a nonflammable olefin thermoplastic elastomer composition for use in skins of interior automotive trim which exhibits excellent primary formability in calendering and postformability, for example, in embossing and vacuum and pressure formings. The composition also produces shaped items having flexibility and flame resistance suited for use in interior automotive trims and from which the generation of corrosive and toxic gases attributed to thermal decomposition in fire, etc. is extremely slight as compared with that of a composition containing a halogenous flame retarder and further to provide a laminate made therefrom.

SUMMARY OF THE INVENTION

The nonflammable olefin thermoplastic elastomer composition for use in skins of interior automotive trim according to the present invention comprises:

an oil-extended olefin thermoplastic elastomer composition (G) comprising 100 parts by weight of an olefin thermoplastic elastomer composition (D) which comprises 50 to 70% by weight of an ethylene/α-olefin copolymer elastomer (A) having a Mooney viscosity (ML1+4(100° C.)) of 40 to 100, 35 to 21% by weight of a polypropylene resin (B) having a crystal melting point of 140° to 165° C. and an ethylene unit content of 1 to 2% by weight, and 15 to 9% by weight of a low-density polyethylene resin (C) having a density of 0.90 to 0.93 g/cm³ and a crystal melting point of 102°–118° C., and 10 to 30 parts by weight, preferably, 15 to 25 parts by weight of a mineral oil (e); and, relative to 100 parts by weight of the oil-extended olefin thermoplastic elastomer composition (G), 25 to 50 parts by weight, preferably, 28 to 40 parts by weight of melamine-coated ammonium polyphosphate (h), 8 to 17 parts by weight, preferably, 10 to 13 parts by weight of a 1,3,5-triazine derivative (j) having a chemical structure represented by the following general formula (I):

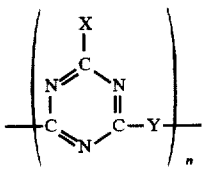

wherein X represents a morpholino or piperidino group, Y represents a divalent group derived from piperazine and n is a number of 1 or greater, and 0.1 to 3 parts by weight, preferably, 0.5 to 2 parts by weight of a lubricant (f).

In the nonflammable olefin thermoplastic elastomer composition of the present invention, it is preferred that the polypropylene resin (B) be a propylene polymer composition comprising a crystalline propylene/ethylene copolymer or crystalline propylene homopolymer and a propylene/ethylene copolymer having an ethylene unit content of 0.5 to 4% by weight, the propylene polymer composition in its entirety having an ethylene unit content of 1 to 2% by weight.

The laminate of the present invention comprises a foamed polyolefin resin sheet and a nonflammable sheet of the above nonflammable olefin thermoplastic elastomer composition.

In the laminate of the present invention, it is preferred that the foamed polyolefin resin sheet have an expansion ratio of 20 to 30 and an average thickness of 1 to 3 mm and the nonflammable sheet have an average thickness of 0.25 to 0.45 mm.

DETAILED DESCRIPTION OF THE INVENTION

The nonflammable olefin thermoplastic elastomer composition for use in skins of interior automotive trim and the laminate made therefrom according to the present invention will be described in greater detail below.

The nonflammable olefin thermoplastic elastomer composition for use in skins of interior automotive trim according to the present invention comprises specified amounts of an oil-extended olefin thermoplastic elastomer composition (G), melamine-coated ammonium polyphosphate (h), a 1,3,5-triazine derivative (j) and a lubricant (f).

The oil-extended olefin thermoplastic elastomer composition (G) used in the present invention is obtained by blending a mineral oil (e) with the specified olefin thermoplastic elastomer composition (D) comprising an ethylene/α-olefin copolymer elastomer (A), a polypropylene resin (B) and a low-density polyethylene resin (C).

First, the components of the olefin thermoplastic elastomer composition (D) will be described below.

Ethylene/α-Olefin Copolymer Elastomer (A)

In the present invention, the ethylene/α-olefin copolymer elastomer (A) for use in the preparation of the olefin thermoplastic elastomer composition (D) is an amorphous or lowly crystalline copolymer formed from ethylene and an α-olefin monomer which has a Mooney viscosity (ML1+4 (100° C.)) of 40 to 100, preferably, 70 to 90.

A composition comprising an ethylene/α-olefin copolymer elastomer whose Mooney viscosity (ML1+4(100° C.)) is far lower than 40 has poor adherence to calender rolls at the time of calendering. On the other hand, a composition comprising an ethylene/α-olefin copolymer elastomer whose Mooney viscosity (ML1+4(100° C.)) is far higher than 100 leads to formation of a bank (resin pool) just before the holding between parallel rolls and induces the phenomenon commonly known as "tonguing" in which the bank is brought up, as it is.

Examples of the above olefin copolymer elastomers (A) include ethylene/propylene copolymer elastomers (hereinafter may be referred to as "EPMs") and ethylene/propylene/nonconjugated diene terpolymer elastomers (hereinafter may be referred to as "EPDMs"). Of these, EPMs and EPDMs whose propylene unit content ranges from 25 to 30% by weight, especially, 26 to 28% by weight are preferred.

The EPDM suitably employed in the present invention has a nonconjugated diene unit content generally ranging from 10 to 20, preferably, from 12 to 15 in terms of iodine value. Examples of the nonconjugated dienes for use in this EPDM include 5-ethylidene-2-norbornene, dicyclopentadiene and 1,4-hexadiene.

Polypropylene Resin (B)

The polypropylene resin (B) for use in the preparation of the olefin thermoplastic elastomer composition (D) according to the present invention is a crystalline propylene resin having a crystal melting point of 140° to 165° C., preferably, 150° to 156° C. and an ethylene unit content of 1 to 2% by weight, preferably, 1.2 to 1.6% by weight.

When a composition comprising a polypropylene resin having an ethylene unit content of much greater than 2% by weight is sheeted and subjected to postforming, for example, by embossing and vacuum forming, the problems are encountered such that the composition sticks to the embossing rolls at the time of postforming embossing and that the emboss disappears at the time of subsequent vacuum forming. On the other hand, when a composition comprising a polypropylene resin having an ethylene unit content of far lower than 0.5% by weight is sheeted, the problem encountered that breakage of postformed article is often occurs at the time of vacuum forming.

The above polypropylene resin (B) may be a resin composition having an ethylene unit content of 1–2% by weight, preferably 1.2–1.6% by weight which preferably comprises a crystalline propylene/ethylene random copolymer or crystalline propylene homopolymer, and a propylene/ethylene random copolymer having an ethylene unite content of 0.5 to 4% by weight.

Although the melt flow rate of the polypropylene resin (B) is not particularly limited, it is generally preferred that the melt flow rate MFR (230° C., 2.16 kgf) range from 1 to 50 g/10 min, especially, 5 to 10 g/10 min.

Low-Density Polyethylene Resin (C)

The low-density polyethylene resin is a branched polyethylene. This branching prevents a dense molecular arrangement, so that the polyethylene resin has a low density and is tough and flexible.

The low-density polyethylene resin (C) for use in the preparation of the olefin thermoplastic elastomer composition (D) according to the present invention is a crystalline ethylene polymer having a true density of 0.90 to 0.93 g/cm$^3$, preferably, 0.91 to 0.92 g/cm$^3$ and a crystal melting point of 102°–118 ° C., preferably, 104°–112° C.

When resin compositions comprising any of other polyethylene resins than the low-density polyethylene resin (C) of the above density, e.g., a linear low-density polyethylene resin (L-LDPE) and high-density polyethylene resin (HDPE) are sheeted by calendering and post-formed by vacuum forming, it is difficult to simultaneously satisfy the calendering formability (roll workability) and vacuum forming workability.

Although the melt index of the low-density polyethylene resin (C) to be used in the present invention is not particularly limited, it is generally preferred that the melt index MI (190° C., 2.16 kgf) range from 1 to 20 g/10 min, especially, 1 to 10 g/10 min and, still especially, 2 to 5 g/10 min.

In the invention, the olefin thermoplastic elastomer composition (D) used in the preparation of the oil-extended olefin thermoplastic elastomer composition (G) contains the above ethylene/α-olefin copolymer elastomer (A) in an amount of 50 to 70% by weight, preferably, 54 to 64% by weight.

In the sheeting by calendering, the use of a composition obtained by compounding a composition (D'1) in which the content of ethylene/α-olefin copolymer elastomer (A) is far lower than 50% by weight with a mineral oil (e) and the below described additives (h), (j) and (f) encounters the problem that the composition sticks to calender rolls. On the other hand, when use is made of a like composition (D'2) in which, however, the content of the above elastomer (A) is far higher than 70% by weight, problems are encountered. Not only does the phenomenon known as "tonguing" attributed to the bank formed on calender rolls occur, but also in the postforming of the obtained sheet, the vacuum forming suffers from breakage of the postformed article and/or satisfactory embossing cannot be effected.

The olefin thermoplastic elastomer composition (D) for use in the present invention contains the above polypropylene resin (B) in an amount of 35 to 21% by weight, preferably, 32 to 25% by weight.

In the sheeting by calendering and postforming by vacuum forming, the use of a composition obtained by compounding a composition (D'3) in which the content of polypropylene resin (B) is far higher than 35% by weight with a mineral oil (e) and the below described additives (h), (j) and (f) encounters the problem that the composition sticks to calender rolls. On the other hand, when use is made of a composition (D'4) in which, however, the content of the above polypropylene resin (B) is far lower than 21% by weight, problems are encountered. Not only does the phenomenon known as "tonguing" attributed to the bank formed on calender rolls occur but also, in the postforming of the obtained sheet, the vacuum forming suffers from breakage of the postformed article and/or satisfactory embossing cannot be effected.

The olefin thermoplastic elastomer composition (D) for use in the present invention contains the above low-density polyethylene resin (C) in an amount of 15 to 9% by weight, preferably, 14 to 11% by weight.

In the sheeting by calendering, the use of a composition obtained by compounding a composition (D'5) in which the content of low-density polyethylene resin (C) is far larger than 15% by weight with a mineral oil (e) and the below described additives (h), (j) and (f) encounters the problems that not only does the phenomenon known as "tonguing" attributed to the bank formed on calender rolls occur but also, in the postforming of the obtained sheet, postforming embossability is deteriorated. On the other hand, when use is made of a like composition (D'6) in which, however, the content of the above low-density polyethylene resin (C) is far lower than 9% by weight, the problem is encountered that the composition causes excessive sticking to the surface of calender rolls.

It is preferred that the olefin thermoplastic elastomer composition (D) for use in the present invention be prepared by blending together the above resin components (A), (B) and (C) without the formation of crosslinkings, from the viewpoint of formability at the final calendering and workability at the vacuum forming.

For example, the olefin thermoplastic elastomer composition (D) can be prepared by preparing specified amounts of the ethylene/α-olefin copolymer elastomer (A), polypropylene resin (B) and low-density polyethylene resin (C), charging them into an agitation mixer such as Henschel mixer (trade name), a supermixer or a tumbler mixer and effecting agitation blending generally for 1 to 10 min. In particular, while the use of the tumbler mixer takes about 10 min, the supermixer advantageously enables preparing the desired composition (D) by agitation blending within about 3 min.

According to necessity, the olefin thermoplastic elastomer composition (D) can be melt kneaded by the use of a screw extruder or the like generally at 170° to 250° C., preferably, 210° to 230° C. and thereafter pelletized.

The oil-extended olefin thermoplastic elastomer composition (G) for use in the present invention comprises the above olefin thermoplastic elastomer composition (D) and a mineral oil (e).

Although the mineral oil (e) for use in the present invention is not particularly limited, the use of high-boiling-point oil fractions such as paraffinic, naphthenic and aromatic mineral oils is preferred from the viewpoint of not only the capability of improving the primary formability at calendering but also the capability of enhancing the mechanical properties of obtained shaped items suitable from the viewpoint of the is the most suitable from the viewpoint of the hue and odor.

In this oil-extended olefin thermoplastic elastomer composition (G), 10 to 30 parts by weight, preferably, 15 to 25 parts by weight of mineral oil (e) is contained per 100 parts by weight of the olefin thermoplastic elastomer composition (D).

The sheet or shaped item formed from a composition obtained by compounding an oil-extended olefin thermoplastic elastomer composition (G'1) in which the amount of the above mineral oil (e) added is far larger than 30 parts by weight with the below described additives (h), (j) and (f) has a strength and flame resistance which are lower than the desired values. On the other hand, when use is made of an oil-extended olefin thermoplastic elastomer composition (G'2) in which, however, the amount of added mineral oil (e) is far lower than 10 parts by weight, the composition causes excessive sticking to the surface of rolls at the time of calendering.

From the same viewpoint as in the composition (D), it is preferred that the oil-extended olefin thermoplastic elastomer composition (G) for use in the present invention be produced by a method in which blending of (D) and (e) can be effected without the formation of crosslinkings between resin components. For example, the oil-extended olefin thermoplastic elastomer composition (G) can be produced by adding a mineral oil (e) to a specified amount of the olefin thermoplastic elastomer composition (D) and following the same procedure as in the above olefin thermoplastic elastomer composition (D). Further, also, the obtained oil-extended olefin thermoplastic elastomer composition (G) may be pelletized by the use of a screw extruder or the like.

The nonflammable olefin thermoplastic elastomer composition of the present invention contains a melamine-coated ammonium polyphosphate (h), a 1,3,5-triazine derivative (j) and a lubricant (f) as well as the above oil-extended olefin thermoplastic elastomer composition (G).

Each of these additives (h), (j) and (f) will be described in detail below.

Melamine-Coated Ammonium Polyphosphate (h)

The melamine-coated ammonium polyphosphate (h) for use in the present invention is in the form of granules in which melamine is added to and/or adhered to the surface of a core of ammonium polyphosphate. Examples of the above melamine-coated ammonium polyphosphates (h) include granules in which melamine is added to and/or adhered to the surface of a nonhalogenous flame retarder represented by the general formula:

$$(NH_4)_{n+2}P_nO_{3n+1} \tag{II}$$

wherein n is a positive number of greater than 2, having melamine added to and/or caused to adhere to the surface thereof.

Examples of the above ammonium polyphosphates include those commercially available which are, for example, Sumisafe P (trade name, produced by Sumitomo Chemical Co., Ltd.), Exolite 422 (trade name, produced by Hoechst), Exolite 700 (trade name, produced by Hoechst) and PhosCheck P/40 (trade name, produced by Monsanto).

Type II ammonium polyphosphate particles described in Japanese Patent Laid-open Publication No. 4(1992)-300204 can be used as a starting material of the melamine-coated ammonium polyphosphate (h). Type II ammonium polyphosphate powder can be obtained by, for example, the following procedure.

Equimolar amounts of diammonium phosphate and phosphorus pentoxide are heated at 290° to 300° C. under agitation. An aqueous solution of a 0.5-fold mol of urea (concentration: 77% by weight) is added by spraying and fired at 250° to 270° C. in an ammonia atmosphere for some hours. Thus, Type II ammonium polyphosphate powder is obtained.

The melamine-coated ammonium polyphosphate (h) for use in the present invention can be produced from ammonium polyphosphate by the following procedure. In the first stage, powdery ammonium polyphosphate represented by the above general formula (II) is charged into a heating/kneading device, for example, a preheated kneader. Heating is conducted at such temperatures that the ammonium polyphosphate powder does not melt and deamination of the ammonium polyphosphate easily occurs, i.e., 300° C. or below, preferably, 200° to 280° C. for 0.5 to 5 hours. This heating causes partial removal of the ammonia which is originally present in the ammonium polyphosphate in the stoichiometric amount (5 to 10% by weight based on the stoichiometric amount of ammonia removed). The surface of the thus obtained ammonium polyphosphate (hereinafter generically may be referred to as "ammonia-deficient ammonium polyphosphate") has hydroxyl groups (oxy groups) formed because of the deamination to thereby exhibit acidity. For example, it is preferred that the ammonia-deficient ammonium polyphosphate be in the state of such an ammonia deficiency that the pH value of a 1% by weight aqueous suspension thereof range from 4 to 6.

The ammonia-deficient ammonium polyphosphate can also be produced by suppressing the bonding of ammonia under the stoichiometric amount in the conventional ammonium polyphosphate producing process.

In the second stage, melamine is added to the powder of the ammonia-deficient ammonium polyphosphate, for example, in the same device as used in the deamination at a temperature which is lower than the melting point of the ammonia-deficient ammonium polyphosphate but causes sublimation of melamine, for example, 250° to 300° C. Thus, addition and/or adherence of melamine is on the surface of ammonia-deficient ammonium polyphosphate particles. Commercially available melamine monomers can be used as the above melamine in this reaction.

The above "addition" means the state of added melamine's ionically bonding with acidic hydroxyl groups (oxy groups) derived from ammonium polyphosphate. Therefore, the melamine having undergone the "addition" is stable even when heated and is no longer removed. On the other hand, the above "adherence" means the state of added melamine being adsorbed on the surface of ammonium polyphosphate particles. Continuation of the heating causes the melamine adsorbed on the surface of ammonium polyphosphate particles to undergo repetition of sublimation and adsorption, so that, finally, the melamine ionically bonds with the acidic hydroxyl groups.

In the above reaction, melamine is added to ammonium polyphosphate in an amount of 0.5 to 20% by weight, preferably, 2 to 10% by weight based on the weight of ammonium polyphosphate. The whole amount of added melamine undergoes the addition and/or adherence to the surface of ammonium polyphosphate particles. Thus, the desired melamine-coated ammonium polyphosphate (h) can be obtained.

The above melamine-coated ammonium polyphosphate (h) blended in the olefin thermoplastic elastomer composition produces only nonflammable gases (water, carbon dioxide, nitrogen, etc.) and carbonaceous residue and is scarcely accompanied by the generation of corrosive, halogenous and toxic gases in the decomposition thereof caused by, for example, high temperatures or contact with flame.

1,3,5-Triazine Derivative Component (j)

The 1,3,5-triazine derivative component (j) for use in the present invention is a nonhalogenous flame retarder and a derivative of a six-membered heterocyclic compound having nitrogen atoms at its 1-, 3- and 5-positions. This 1,3,5-triazine derivative component (j) is, for example, one represented by the general formula:

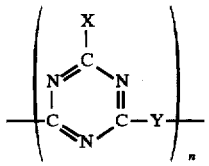

wherein X represents a morpholino or piperidino group, Y represents a divalent group derived from piperazine and n is a number of 1 or greater, preferably, 2 to 50 and, usually, about 11.

Suitable examples of the above 1,3,5-derivative derivative components (j) include oligomers and polymers of 2-piperazinylene-4-morpholino-1,3,5-triazine in which the substituent X is a morpholino group and oligomers and polymers of 2-piperazinylene-4-piperidino-1,3,5-triazine in which the substituent X is a piperidino group.

2-Piperazinylene-4-morpholino-1,3,5-triazine polymer can be produced by, for example, the following procedure.

Equimolar amounts of 2,6-dihalo-4-morpholino-1,3,5-triazine (for example, 2,6-dichloro-4-morpholino-1,3,5-triazine or 2,6-dibromo-4-morpholino-1,3,5-triazine) and piperazine are reacted in an inert solvent such as xylene in the presence of an organic base (for example, triethylamine or tributylamine) or an inorganic base (for example, sodium hydroxide, potassium hydroxide, or sodium carbonate), preferably, by heating at a temperature which is lower than the boiling point of the inert solvent.

After the completion of the reaction, the reaction mixture is filtered to thereby separate solids. The separated solids are washed with boiling water to thereby dissolve by-product salts in the boiling water. The remaining solids free of by-product salts are dried.

The properties of the thus obtained 2-piperazinylene-4-morpholino-1,3,5-triazine are as follows:

solubility: being insoluble in water and common organic solvents, melting point: none (decomposed at about 310° C.), bulk density: 0.3 g/ml and structural formula: represented by the following general formula:

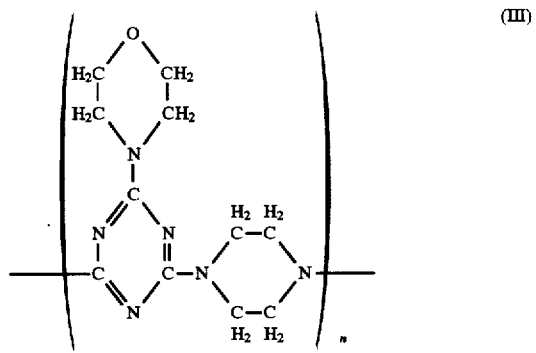

wherein n is 11.

The above 1,3,5-triazine derivative component (j) blended in the olefin thermoplastic elastomer composition produces only nonflammable gases (water, carbon dioxide, nitrogen, etc.) and carbonaceous residue and is scarcely accompanied by the generation of corrosive, halogenous and toxic gases in the decomposition thereof caused by, for example, high temperatures or contact with flame.

The synergistic effect of the 1,3,5-triazine derivative (j) and the melamine-coated ammonium polyphosphate (h) imparts excellent flame resistance to the sheet or other shaped item of the nonflammable olefin thermoplastic elastomer composition for use in skins of interior automotive trim according to the present invention. Because of the synergistic effect, corrosive, halogenous and toxic gases are scarcely generated not only when burned but also during shaped item forming.

Lubricant (f)

In the calendering of the nonflammable olefin thermoplastic elastomer composition for use in skins of interior automotive trim according to the present invention, the lubricant (f) for use in the present invention imparts fluidity to the molten thermoplastic elastomer composition while maintaining a certain degree of compatibility therewith, so that the frictional resistance on the roll surface is reduced. This prevents the sticking of the composition to rolls and facilitates the forming of the composition.

Examples of the lubricants (f) exerting the above functions include higher paraffinic hydrocarbons; higher fatty acid compounds such as higher fatty acids, metal salts of higher fatty acid, higher fatty acid amides and alkyl esters of higher fatty acid (e.g., esters of higher fatty acids and aliphatic monohydric or polyhydric alcohols); higher aliphatic alcohols; polyethers; aromatic carboxylic acid compounds such as phthalic acid diamides and phthalic acid esters; diamine/carboxylic acid condensates; silicones (silicon resin); natural and synthetic rosin; and composite lubricants composed of at least two thereof.

Specific examples of the above lubricants (f) include:

paraffin wax, polyethylene wax, montan wax and hardened castor oil as the higher paraffinic hydrocarbon;

stearic, palmitic, lauric and oleic acids as the higher fatty acid;

magnesium, calcium, aluminum and zinc stearates as the metal salt of higher fatty acid;

stearamide, oleamide, lauramide, ethylenebisstearamide, ethylenebislauramide and stearoleamide as the higher fatty acid amide;

butyl stearate, ethylene glycol monostearate and glycerol distearate as the alkyl ester of higher fatty acid;

stearyl, palmityl, oleyl and lauryl alcohols as the higher aliphatic alcohol;

ethylene oxide/propylene oxide copolymer as the polyether;

bis(2-ethylhexyl)phthalate as the phthalic acid ester;

xylylenediamine/aliphatic carboxylic acid condensates (wax; for example, having approximately 1,000 of average molecular weight) as the diamine/carboxylic acid condensate; and polydimethylsiloxane as the silicone. These lubricants may be used either individually or in combination.

The nonflammable olefin thermoplastic elastomer composition (F) for use in skins of interior automotive trim according to the present invention contains 25 to 50 parts by weight, preferably, 30 to 40 parts by weight of melamine-coated ammonium polyphosphate (h) per 100 parts by weight of the above oil-extended olefin thermoplastic elastomer composition (G).

In the sheeting by calendering and postforming, for example, by vacuum forming, the use of a composition in which the amount of added melamine-coated ammonium polyphosphate (h) is far larger than 50 parts by weight encounters problems. Not only does the phenomenon known as "tonguing" attributed to the bank formed on calender rolls occur but also the obtained sheeted item has poor mechanical strength and the vacuum forming of the obtained sheet is likely to suffer from breakage of the postformed article. On the other hand, when the amount of melamine-coated ammonium polyphosphate (h) added to the composition is far smaller than 25 parts by weight, the problem is encountered that the obtained sheet cannot be endowed with desirable flame resistance.

The nonflammable olefin thermoplastic elastomer composition (F) according to the present invention contains 8 to 17 parts by weight, preferably, 10 to 13 parts by weight of 1,3,5-triazine derivative (j) per 100 parts by weight of the oil-extended olefin thermoplastic elastomer composition (G).

In the sheeting by calendering and postforming by vacuum forming, the use of a composition in which the amount of added 1,3,5-triazine derivative (j) is far larger than 17 parts by weight encounters problems. Not only does the phenomenon known as "tonguing" attributed to the bank formed on calender rolls occur but also the obtained sheeted item has poor mechanical strength and the postformed article is likely to suffer from breakage during vacuum forming. On the other hand, when the amount of 1,3,5-triazine derivative (j) added to the composition is far smaller than 8 parts by weight, the problem is encountered that the obtained sheet cannot be endowed with desirable flame resistance.

The nonflammable olefin thermoplastic elastomer composition (F) for use in skins of interior automotive trim according to the present invention contains 0.1 to 3 parts by weight, preferably, 0.1 to 2 parts by weight of lubricant (f) per 100 parts by weight of the oil-extended olefin thermoplastic elastomer composition (G).

In the sheeting by calendering and postforming by vacuum forming, the use of a composition in which the amount of added lubricant (f) is far smaller than 0.1 part by weight encounters the problem that excessive sticking of the composition to calender rolls occurs. On the other hand, when the amount of added lubricant (f) is far larger than 3 parts by weight, problems are encountered. Not only does the lubricant migrate to the sheet surface during or after the forming with the result that winding of the composition around the calender rolls is often unsatisfactory during calendering, but also the produced sheet has poor coatability and/or a poor appearance.

From the same viewpoint as in the compositions (D) and (G), it is preferred that the above nonflammable olefin thermoplastic elastomer composition (F) be produced by a method in which blending can be effected without the formation of crosslinks between resin components in the blend of the components (D), (h), (j) and (f). For example, the nonflammable olefin thermoplastic elastomer composition (F) can be produced by adding additives (h), (j) and (f) to a specified amount of the oil-extended olefin thermoplastic elastomer composition (G) and following the same procedure as in the above olefin thermoplastic elastomer composition (D). Further, the obtained nonflammable olefin thermoplastic elastomer composition (F) may be pelletized by the use of a screw extruder or the like.

The nonflammable olefin thermoplastic elastomer composition of the present invention may be loaded with other various additives and fillers in amounts not detrimental to the objects of the present invention. Examples of such other additives include an antioxidant, an antistatic agent, a copper inhibitor, a neutralizer (for example, stearic acid metal salts and hydrotalcite), an ultraviolet absorber, an age resistor and a pigment.

The nonflammable olefin thermoplastic elastomer composition (F) of the present invention produces shaped items having flexibility and flame resistance suited for use in interior automotive trims and from which the generation of corrosive and toxic gases attributed to thermal decomposition in fire, etc. is extremely slight.

The laminate of the present invention comprises a nonflammable sheet of the above nonflammable olefin thermoplastic elastomer composition (F) and, laminated thereto, a foamed polyolefin resin sheet. This foamed polyolefin resin sheet imparts a soft touch (feeling of softness) to the laminate.

The nonflammable sheet for use in the laminate of the present invention can be produced by sheeting the nonflammable olefin thermoplastic elastomer composition (F) by, for example, calendering and postforming the sheet by, for example, vacuum forming to thereby form emboss structures or other patterns on the surface of the sheet.

This nonflammable sheet is preferred to be nonporous and has an average thickness of 0.25 to 0.45 mm, preferably, 0.3 to 0.4 mm.

The foamed sheet for use in the laminate of the present invention is prepared from a polyolefin resin as a starting material. This polyolefin resin may be any of conventional polyolefin resins as long as foaming thereof provides flexible shaped items.

Examples of such polyolefin resins include polyethylene resins and polypropylene resins.

Also, the foamed sheet can be produced from the above polyolefin resin along with a conventional foaming agent such as azodicarbonamide and a crosslinking assistant such as divinyl benzene, for example, by melt-kneading them with an extruder at a temperature lower than the decomposition temperature of the foaming agent followed by extruding through a T-die to obtain a sheeted item, irradiating the obtained sheet with electron ray to make the resin components crosslink, and then foaming the sheet at a temperature not lower than the decomposition temperature of the foaming agent.

It is generally preferred that this foamed sheet have an expansion ratio of 20 to 30, especially, 23 to 28 and an average thickness of 1 to 3 mm, especially, 1.5 to 2.5 mm.

The laminate of the present invention can be produced by laminating the foamed sheet to the nonporous nonflammable sheet and bonding them. Although the lamination method is not particularly limited, for example, the heat lamination method is preferred in which the previously fabricated foamed sheet and nonflammable sheet are laminated to each other under pressure at a temperature such that the lamination surfaces of the two sheets can be fusion bonded.

The laminate thus obtained is excellent in postformability and can be formed into a desirable concave or convex shape by vacuum forming.

EFFECT OF THE INVENTION

The nonflammable olefin thermoplastic elastomer composition for use in skins of interior automotive trim according to the present invention exhibits excellent primary formability in calendering and postformability, for example, in embossing and vacuum and pressure formings, and produces shaped items having flexibility and flame resistance suited for use in interior automotive trims. Further, the generation of corrosive and toxic gases therefrom attributed to thermal decomposition in fire, etc. is extremely slight as compared with that of the composition containing a halogenous flame retarder.

The laminate of the present invention not only has flexibility and flame resistance suited for use in interior automotive trims but also exhibits excellent soft touch (feeling of softness) and excellent postformability. Thus, the laminate is suitably employed in the skins of interior automotive trim such as door trim, instrument panel or roof.

EXAMPLE

The present invention will further be illustrated with reference to the following Examples, which in no way limit the scope of the invention. Testing methods employed in measuring properties in the Examples and Comparative Examples are as follows.

(1) Evaluation of tackiness to roll surface (commonly known as "roll tackiness")

Apparatus for Producing Specimen: Sheeting was performed by means of a twin calender mill (roll size, 200 mm in diameter and 500 mm in length; working temperature, 175° C.; rotating speed, 12 rpm/14 rpm; kneading time, 10 min; produced by Nishimura Machinery Co., Ltd.).

Procedure for Producing Specimen: The roll spacing was set so that the obtained sheet had a thickness of 0.35 mm. Pelletized specimen was melt kneaded while causing the same to wind the rolls and, 10 min later, the sheet thus kneaded was sampled as a sheet specimen from the rolls. In the melt kneading, the following evaluation in four grades was conducted on the basis of the tackiness sensed at the time of peeling (cutting back) the sheet from the rolls with the use of a bamboo spatula or the like and the sheeted material yield measured at that time. Of the evaluation results, BB and AA were judged as being acceptable.

AA, peeling made very easily (sampling could be made in a yield of at least 80%);

BB, peeling made easily (sampling could be made in a yield of at least 40% but less than 80%);

CC, peeling difficult (sampling could barely be made in a yield of less than 40%); and DD, peeling impossible (sampling impossible).

(2) Evaluation of phenomenon commonly known as "tonguing" from bank portion on rolls:

In the roll tackiness evaluation of item (1) above, kneading of pelletized specimen while causing the same to wind the rolls was accompanied by formation of a bank (pool of resin) just before the roll gap. The state in which the bank forming materials remains on the bank without being kneaded and, further, is brought up therefrom, is a phenomena commonly called "tonguing".

In this test, the tonguing properties were evaluated in four grades. Of the evaluation results, BB and AA were judged as being acceptable.

AA, no tonguing at all, and the bank was uniformly milled;

BB, substantially no tonguing, and the bank was pretty uniformly milled;

CC, tonguing from part of the bank, but it remained in that part without being brought further upward; and DD, upward tonguing from part or the entirety of the bank.

(3) Evaluation of breakage resistance of formed article during vacuum forming:

The sheet specimen (nonflammable sheet: 0.35 mm in thickness) obtained in the manner mentioned in item (1) above and a foamed polypropylene sheet (2 mm in thickness and 25 in expansion ratio) were laminated to each other by fusion bonding, and a test piece (Japanese Industrial Standard K6301, dumbbell no. 1) was prepared from the resultant laminate. This test piece was subjected to a tensile test in a thermostat (110° C.), and the measured "tensile elongation at break" was evaluated in five grades as an index for the breakage resistance of formed article during vacuum forming. When cracking or perforation occurred on the surface of the test piece, the elongation at the time of the occurrence was regarded as the tensile elongation at break. The tensile conditions were as set forth in Japanese Industrial Standard K6301. Of the evaluation results, BB and AA were judged as being acceptable.

*AA*, 300% <= elongation;
*BB*, 250% <= elongation < 300%;
*CC*, 200% <= elongation < 250%;
*DD*, 150% <= elongation < 200%; and
*EE*, elongation < 150%.

(4) Evaluation of emboss survival ratio:

The sheet specimen (flame-resistant sheet: 0.35 mm in thickness) obtained in the manner mentioned in item (1) above was embossed (to give leather emboss) by the use of a hot press (200° C.), and the average roughness [(Ra) 1] of the embossed sheet surface was measured:

Measuring apparatus; a surface roughness meter (manufactured by Kosaka Laboratory Ltd.)

Measuring Conditions; the average distance between roughness measurements of 40 mm, the measuring speed of 0.5 mm/sec and the cutoff of 0.8 mm.

This embossed sheet was allowed to stand still in a dry oven (140° C.) for 3 min, and a stainless steel plate having a smooth surface was placed on the embossed surface. Further, a load (2.4 kgf) was put on the stainless steel plate, and the whole was allowed to stand still in a dry oven (140° C.) for 5 min. Thereafter, the whole was taken out, and the load and the stainless steel plate were quickly removed. The sheet was allowed to naturally cool to room temperature.

After the cooling, the emboss survival ratio of the embossed sheet was determined by measuring the average roughness [(Ra)2] of the embossed surface with the use of the above meter under the above conditions. The amount of surviving emboss was calculated by the formula given below, and the value was regarded as representing the emboss survival ratio. This emboss survival ratio was further regarded as being an index for the emboss survival ratio exhibited after the vacuum forming and evaluated in five grades. Of the evaluation results, BB and AA were judged as being acceptable.

Emboss survival ratio=[(Ra)2/(Ra)1]×100(%)

wherein (Ra)2 is the value of surface emboss after heat treatment and (Ra)1 is the value of surface emboss before heat treatment.

AA, 75% <= emboss survival ratio;
BB, 65% <= emboss survival ratio < 75%;
CC, 50% <= emboss survival ratio < 60%;
DD, 40% <= emboss survival ratio < 50%; and
EE, emboss survival ratio < 40%.

(5) Flame resistance:

The laminate obtained in the manner mentioned in item (3) above (nonflammable sheet (0.35 mm in thickness)/foamed polypropylene sheet (2 mm in thickness)) was used as a sheet specimen to evaluate the flame resistance thereof in accordance with FMVSS 302. At the testing, the flame-resistant sheet (0.35 mm in thickness) side was exposed to flame. The criterion was a burning velocity of 100 mm/min, and values lower than the criterion were judged as being acceptable.

The following abbreviations were employed for the ethylene/α-olefin copolymer elastomer, polypropylene resin, low-density polyethylene resin, mineral oil, melamine-coated ammonium polyphosphate, 1,3,5-triazine derivative, lubricant and other additives used in the Examples and Comparative Examples.

Ethylene/α-Olefin Copolymer Elastomer

A1: ethylene/propylene/5-ethylidene-2-norbornene terpolymer elastomer (propylene unit content, 28% by weight; Mooney viscosity ML1+4(100° C.), 88; substituted norbornene unit content (based on iodine value), 15; and A2: ethylene/propylene/5-ethylidene-2-norbornene terpolymer elastomer (propylene unit content, 26% by weight; Mooney viscosity ML1+4(100° C.), 38; substituted norbornene unit content (based on iodine value), 19;

Polypropylene Resin

B1: propylene/ethylene crystalline copolymer (crystal melting point, 154° C.; ethylene unit content, 1.4% by weight; MFR (230° C., 2.16 kgf), 8 g/10 min);

B2: resin composition consisting of 50% by weight of propylene/ethylene crystalline copolymer (crystal melting point, 146° C.; ethylene unit content, 2.5% by weight; MFR (230° C., 2.16 kgf), 8 g/10 min) and 50% by weight of B3 defined below, the resin composition having an ethylene unit content of 1.2% by weight;

B3: crystalline propylene homopolymer (crystal melting point, 164° C.; MFR (230° C., 2.16 kgf), 8 g/10 min);

B4: propylene/ethylene crystalline copolymer (crystal melting point, 159° C.; ethylene unit content, 0.2% by weight; MFR (230° C., 2.16 kgf), 10 g/10 min);

B5: propylene/ethylene crystalline copolymer (crystal melting point, 138° C.; ethylene unit content, 4.6% by weight; MFR (230° C., 2.16 kgf), 2 g/10 min); and B6: propylene/ethylene crystalline copolymer (crystal melting point, 165° C.; ethylene unit content, 7.5% by weight; MFR (230° C., 2.16 kgf), 0.6 g/10 min);

Polyethylene Resin

C1: low-density polyethylene resin (crystal melting point, 107° C.; density, 0.90–0.93 g/cm$^3$; MI (190° C., 2.16 kgf), 2 g/10 min);

C2: high-density polyethylene resin (crystal melting point, 135° C.; density, 0.95–0.97 g/cm$^3$; MI (190° C., 2.16 kgf), 5 g/10 min); and C3: linear low-density polyethylene resin (crystal melting point, 123° C.; density, 0.92–0.94 g/cm$^3$; MI (190° C., 2.16 kgf), 8 g/10 min);

Mineral Oil e1: paraffinic mineral oil (kinematic viscosity, 380 cSt (40° C.); trade name, Diana Process Oil PW380; produced by Idemitsu Kosan Co., Ltd.); and e2: naphthenic mineral oil;

Ammonium Polyphosphate h1: melamine-coated ammonium polyphosphate; and h2: commercially available ammonium polyphosphate (trade name, Exolite 422; produced by Hoechst);

1,3,5-Triazine Derivative j1: 2-piperazinylene-4-morpholino-1,3,5-triazine polymer (degree of polymerization (n)=about 11);

Lubricant f1: xylylenediamine/aliphatic carboxylic acid diamide [trade name, Light-amide WH-195; produced by Kyoeisha Chemical Co., Ltd.];

Stabilizer z1: tetrakis[methylene 3-(3,5-di-t-butyl-4-hydroxyphenyl)propionate]methane (trade name, Irganox 1010, produced by Ciba-Geigy Japan);

z2: bis(2,4-di-t-butylphenyl)pentaerythritol diphosphite (trade name, MERK PEP-24G, produced by Asahi Denka Kogyo K. K.); and z3: calcium stearate (also acts as a lubricant).

Example 1

(Preparation of composition G1)

100 parts by weight of composition D1 (polymer composition consisting of 60% by weight of component A1, 28% by weight of component B1 and 12% by weight of component C1), 20 parts by weight of extender oil e1 and 0.3 part by weight of composite processing stabilizer (combination of 0.1 part by weight of component z1, 0.1 part by weight of component z2 and 0.1 part by weight of component z3) were simultaneously blended together by means of Henschel mixer (trade name). The resultant blend was charged into a twin-screw extruder (L/D=45, trade name: KTX-44, manufactured by Kobe Steel, Ltd.), melt kneaded at 230° C. and extruded into pellets of composition G1.

Flame retarder (consisting of 33 parts by weight of component h1 and 11 parts by weight of component j1) and 1 part by weight of lubricant f1 were added to 100 parts by weight of the above composition G1 and simultaneously blended together by means of Henschel mixer (trade name). The resultant blend was charged into a twin-screw extruder (L/D=45, trade name: KTX-44, manufactured by Kobe Steel, Ltd.), melt kneaded at 230° C. and extruded into pellets of final composition F1. The recipe for obtaining final composition F1 is given in Table 1.

With respect to the obtained final composition F1, the above properties, i.e., the tackiness to rolls (1) and tonguing from bank on rolls (2) as exhibited at calendering and the breakage of postformed article resistance at vacuum forming (3), emboss survival ratio (4) and flame resistance (burning velocity) (5) as exhibited by the sheet specimens were measured and evaluated. The results are given in Table 4.

Example 2

Composition G2 was obtained according to the same recipe and the same procedure as in Example 1, except that use was made of composition D2 (composition consisting of 50% by weight of component A1, 35% by weight of component B1 and 15% by weight of component C1), and final composition F2 was obtained therefrom according to the same recipe and the same procedure as in Example 1. The recipe for obtaining the above final composition F2 is given in Table 1.

The property evaluation tests (1) to (5) of the final composition F2 and the sheet specimens therefrom were performed in the same manner as in Example 1. The obtained measurement results are given in Table 4.

Example 3

Composition F3 was obtained according to the same recipe and the same procedure as in Example 1, except that composition G3 was obtained from composition D3 (composition consisting of 70% by weight of component A1, 21% by weight of component B1 and 9% by weight of component C1). The recipe for obtaining the above final composition F3 is given in Table 1.

The property evaluation tests (1) to (5) of the final composition F3 and the sheet specimens therefrom were performed in the same manner as in Example 1. The obtained measurement results are given in Table 4.

Comparative Example 1

Composition G4 was obtained according to the same recipe and the same procedure as in Example 1, except that use was made of composition D4 (composition consisting of 40% by weight of component A1, 42% by weight of component B1 and 18% by weight of component C1), and final composition F4 was obtained therefrom according to the same procedure as in Example 1. The recipe for obtaining the above final composition F4 is given in Table 1.

The property evaluation tests (1) to (5) of the final composition F4 and the sheet specimens therefrom were performed in the same manner as in Example 1. The obtained measurement results are given in Table 4.

Comparative Example 2

Composition G5 was obtained according to the same recipe and the same procedure as in Example 1, except that use was made of composition D5 (composition consisting of 80% by weight of component A1, 14% by weight of component B1 and 6% by weight of component C1), and final composition F5 was obtained therefrom according to the same recipe and the same procedure as in Example 1. The recipe for obtaining the above final composition F5 is given in Table 1.

The property evaluation tests (1) to (5) of the final composition F5 and the sheet specimens therefrom were performed in the same manner as in Example 1. The obtained measurement results are given in Table 4.

As apparent from Table 4, the respective final compositions F1, F2 and F3 of Examples 1, 2 and 3 and the sheet specimens therefrom passed all the evaluation items beyond question.

The final composition F4 of Comparative Example 1 failed the roll tackiness.

The final composition F5 of Comparative Example 2 failed the tonguing and the sheet specimen obtained from the composition F5 failed the breakage resistance during vacuum forming and emboss survival ratio.

Example 4

Flame retarder (consisting of 25 parts by weight of component h1 and 8 parts by weight of component j1) and 1 part by weight of lubricant f1 were added to 100 parts by weight of composition G6 of the same recipe as that of composition G1 of Example 1 and simultaneously blended together by means of Henschel mixer (trade name). The resultant blend was charged into a twin-screw extruder (L/D=45, trade name: KTX-44, manufactured by Kobe Steel, Ltd.), melt kneaded at 200° C. and extruded into pellets of final composition F6. The recipe for obtaining final composition F6 is given in Table 1.

The property evaluation tests (1) to (5) of the final composition F6 and the sheet specimens therefrom were performed in the same manner as in Example 1. The obtained measurement results are given in Table 4.

Example 5

Flame retarder (consisting of 50 parts by weight of component h1 and 17 parts by weight of component j1) and 1 part by weight of lubricant f1 were added to 100 parts by weight of composition G7 of the same recipe as that of composition G1 of Example 1 and simultaneously blended together by means of Henschel mixer (trade name). The resultant blend was charged into a twin-screw extruder (L/D=45, trade name: KTX-44, manufactured by Kobe Steel, Ltd.), melt kneaded at 200° C. and extruded into pellets of final composition F7. The recipe for obtaining final composition F7 is given in Table 1.

The property evaluation tests (1) to (5) of the final composition F7 and the sheet specimens therefrom were performed in the same manner as in Example 1. The obtained measurement results are given in Table 4.

Comparative Example 3

Flame retarder (consisting of 20 parts by weight of component h1 and 4 parts by weight of component j1) and 1 part by weight of lubricant f1 were added to 100 parts by weight of composition G8 of the same recipe as that of composition G1 of Example 1 and simultaneously blended together by means of Henschel mixer (trade name). The resultant blend was charged into a twin-screw extruder (L/D=45, trade name: KTX-44, manufactured by Kobe Steel, Ltd.), melt kneaded at 200° C. and extruded into pellets of final composition F8. The recipe for obtaining final composition F8 is given in Table 1.

The property evaluation tests (1) to (5) of the final composition F8 and the sheet specimens therefrom were performed in the same manner as in Example 1. The obtained measurement results are given in Table 4.

Comparative Example 4

Flame retarder (consisting of 75 parts by weight of component h1 and 25 parts by weight of component j1) and 1 part by weight of lubricant f1 were added to 100 parts by weight of composition G9 of the same recipe as that of composition G1 of Example 1 and simultaneously blended together by means of Henschel mixer (trade name). The resultant blend was charged into a twin-screw extruder (L/D=45, trade name: KTX-44, manufactured by Kobe Steel, Ltd.), melt kneaded at 200° C. and extruded into pellets of final composition F9. The recipe for obtaining final composition F9 is given in Table 1.

The property evaluation tests (1) to (5) of the final composition F9 and the sheet specimens therefrom were performed in the same manner as in Example 1. The obtained measurement results are given in Table 4.

As apparent from Table 4, the sheet specimens obtained from the respective final compositions F6 and F7 of Examples 4 and 5 passed all the evaluation items beyond question.

The sheet specimen obtained from the final composition F8 of Comparative Example 3 failed the burning velocity.

The final composition F9 of Comparative Example 4 failed the roll tackiness (1) and tonguing (2) and the sheet specimen obtained from the final composition F9 failed the breakage resistance during vacuum forming (3).

Example 6

Composition G10 was obtained according to the same recipe and the same procedure as in Example 1, except that 20 parts by weight of mineral oil e1 as an extender oil was blended with composition D10 (composition consisting of 60% by weight of component A1, 28% by weight of component B2 and 12% by weight of component C1). Further, final composition F10 was obtained according to the same recipe and the same procedure as in Example 1, except that use was made of the composition G10. The recipe for obtaining the above final composition F10 is given in Table 2.

The property evaluation tests (1) to (5) of the final composition F10 and the sheet specimens therefrom were performed in the same manner as in Example 1. The obtained measurement results are given in Table 4.

Comparative Example 5

Composition G11 was obtained according to the same recipe and the same procedure as in Example 1, except that 5 parts by weight of mineral oil e1 was blended with 100 parts by weight of composition D11 of the same recipe as that of composition D1 of Example 1. Further, final composition F11 was obtained according to the same recipe and the same procedure as in Example 1, except that use was made of the composition G11. The recipe for obtaining the above final composition F11 is given in Table 2.

The property evaluation tests (1) to (5) of the final composition F11 and the sheet specimens therefrom were performed in the same manner as in Example 1. The obtained measurement results are given in Table 4.

Comparative Example 6

Composition G12 was obtained according to the same recipe and the same procedure as in Example 1, except that 40 parts by weight of mineral oil e1 was blended with 100 parts by weight of composition D12 of the same recipe as that of composition D1 of Example 1. Further, final composition F12 was obtained according to the same recipe and the same procedure as in Example 1, except that use was made of the composition G12. The recipe for obtaining the above final composition F12 is given in Table 2.

The property evaluation tests (1) to (5) of the final composition F12 and the sheet specimens therefrom were performed in the same manner as in Example 1. The obtained measurement results are given in Table 4.

Comparative Example 7

Composition G13 was obtained according to the same recipe and the same procedure as in Example 1, except that 20 parts by weight of mineral oil e1 was blended with 100 parts by weight of composition D13 of the same recipe as that of composition D1 of Example 1. Further, final composition F13 was obtained according to the same recipe and the same procedure as in Example 1, except that use was made of the composition G13 and that no lubricant was employed. The recipe for obtaining the above final composition F13 is given in Table 2.

The property evaluation tests (1) to (5) of the final composition F13 and the sheet specimens therefrom were performed in the same manner as in Example 1. The obtained measurement results are given in Table 4.

Comparative Example 8

Composition G14 was obtained according to the same recipe and the same procedure as in Example 1, except that use was made of composition D14 (composition consisting of 60% by weight of component A2, 28% by weight of component B1 and 12% by weight of component C1). Further, final composition F14 was obtained according to the same recipe and the same procedure as in Example 1, except that use was made of the composition G14. The recipe for obtaining the above final composition F14 is given in Table 2.

The property evaluation tests (1) to (5) of the final composition F14 and the sheet specimens therefrom were performed in the same manner as in Example 1. The obtained measurement results are given in Table 4.

Comparative Example 9

Composition G15 was obtained according to the same recipe and the same procedure as in Example 1, except that use was made of composition D15 (composition consisting of 60% by weight of component A1, 28% by weight of component B3 and 12% by weight of component C1). Further, final composition F15 was obtained according to the same recipe and the same procedure as in Example 1, except that use was made of the composition G15. The recipe for obtaining the above final composition F15 is given in Table 2.

The property evaluation tests (1) to (5) of the final composition F15 and the sheet specimens therefrom were performed in the same manner as in Example 1. The obtained measurement results are given in Table 4.

Comparative Example 10

Composition G16 was obtained according to the same recipe and the same procedure as in Example 1, except that use was made of composition D16 (composition consisting of 60% by weight of component A1, 28% by weight of component B4 and 12% by weight of component C1). Further, final composition F16 was obtained according to the same recipe and the same procedure as in Example 1, except that use was made of the composition G16. The recipe for obtaining the above final composition F16 is given in Table 2.

The property evaluation tests (1) to (5) of the final composition F16 and the sheet specimens therefrom were performed in the same manner as in Example 1. The obtained measurement results are given in Table 4.

Comparative Example 11

Composition G17 was obtained according to the same recipe and the same procedure as in Example 1, except that use was made of composition D17 (composition consisting of 60% by weight of component A1, 28% by weight of component B5 and 12% by weight of component C1). Further, final composition F17 was obtained according to the same recipe and the same procedure as in Example 1, except that use was made of the composition G17. The recipe for obtaining the above final composition F17 is given in Table 2.

The property evaluation tests (1) to (5) of the final composition F17 and the sheet specimens therefrom were performed in the same manner as in Example 1. The obtained measurement results are given in Table 4.

Comparative Example 12

Composition G18 was obtained according to the same recipe and the same procedure as in Example 1, except that use was made of composition D18 (composition consisting of 60% by weight of component A1, 28% by weight of component B1 and 12% by weight of component C2). Further, final composition F18 was obtained according to the same recipe and the same procedure as in Example 1, except that use was made of the composition G18. The recipe for obtaining the above final composition F18 is given in Table 2.

The property evaluation tests (1) to (5) of the final composition F18 and the sheet specimens therefrom were performed in the same manner as in Example 1. The obtained measurement results are given in Table 4.

Comparative Example 13

Composition G19 was obtained according to the same recipe and the same procedure as in Example 1, except that use was made of composition D19 (composition consisting of 60% by weight of component A1, 28% by weight of component B1 and 12% by weight of component C3). Further, final composition F19 was obtained according to the same recipe and the same procedure as in Example 1, except that use was made of the composition G19. The recipe for obtaining the above final composition F19 is given in Table 2.

The property evaluation tests (1) to (5) of the final composition F19 and the sheet specimens therefrom were performed in the same manner as in Example 1. The obtained measurement results are given in Table 4.

As apparent from Table 4, the final composition F10 of Example 6 and the sheet specimens therefrom passed all the evaluation items beyond question.

The final composition F11 of Comparative Example 5 failed both the roll tackiness and the tonguing.

The sheet specimen obtained from the final composition F12 of Comparative Example 6 failed both the burning velocity and the emboss survival ratio.

The final composition F13 of Comparative Example 7 failed the roll tackiness.

The final composition F14 of Comparative Example 8 failed the roll tackiness.

The final composition F15 of Comparative Example 9 failed the roll tackiness, and the sheet specimen therefrom failed the breakage resistance during vacuum forming.

The final composition F16 of Comparative Example 10 failed the roll tackiness, and the sheet specimen therefrom failed the breakage of postformed article resistance at vacuum forming.

The sheet specimen obtained from the final composition F17 of Comparative Example 11 failed the emboss survival ratio.

The sheet specimen obtained from the final composition F18 of Comparative Example 12 failed the breakage of postformed article resistance during vacuum forming.

The final composition F19 of Comparative Example 13 failed the roll tackiness.

Comparative Example 14

30 parts by weight of mineral oil e2 as an extender oil, 0.25 part by weight of 1,3-bis(t-butylperoxyisopropyl) benzene as a crosslinking agent and 0.25 part by weight of divinylbenzene as a crosslinking auxiliary were added to 100 parts by weight of composition D20 (composition consisting of 70% by weight of component A1, 15% by weight of component B3 and 15% by weight of polyisobutylene resin (trade name, Vistanex MML-100; produced by Exxon Chemical) as a component not included in the ethylene resin C but corresponding thereto). Further, the same amount of the same processing stabilizer as in Example 1 was added to obtain a blend which was then charged into Henschel mixer (trade name) and simultaneously blended together. The resultant blend was charged into a twin-screw extruder (L/D=45, trade name: KTX-44, manufactured by Kobe Steel, Ltd.), melt kneaded and crosslinked at 230° C. and extruded into pellets of composition G20.

With 77 parts by weight of obtained pellets G20, 23 parts by weight of component C1, flame retarder (consisting of 33 parts by weight of component h1, 11 parts by weight of component j1) and 1 part by weight of component f1 were mixed and simultaneously blended together by means of Henschel mixer (trade name). The resultant blend was charged into a twin-screw extruder (L/D=45, trade name: KTX-44, manufactured by Kobe Steel, Ltd.), melt kneaded at 200° C. and extruded into pellets of final composition F20. The recipe for obtaining final composition F20 is given in Table 3.

The property evaluation tests (1) to (5) of the final composition F20 and the sheet specimens therefrom were performed in the same manner as in Example 1. The obtained measurement results are given in Table 4.

Comparative Example 15

30 parts by weight of mineral oil e2, the same amount of the same composite processing stabilizer as in Example 1, 0.25 part by weight of 1,3-bis(t-butylperoxyisopropyl) benzene as a crosslinking agent and 0.25 part by weight of divinylbenzene as a crosslinking auxiliary were added to composition D21 (composition consisting of 80 parts by weight of component A1 and 20 parts by weight of component B3) and blended by means of Henschel mixer (trade name). The resultant blend was charged into a twin-screw extruder (L/D=45, trade name: KTX-44, manufactured by Kobe Steel, Ltd.), melt kneaded at 230° C. and extruded while effecting crosslinking into pellets of crosslinked composition G21.

Composition D22 (composition consisting of 50 parts by weight of component A1 and 50 parts by weight of component B3) was blended by means of Henschel mixer (trade name). The resultant blend was charged into a twin-screw extruder (L/D=45, trade name: KTX-44, manufactured by Kobe Steel, Ltd.), melt kneaded at 230° C. and extruded into pellets D22.

60 parts by weight of obtained pellets of crosslinked composition G21, 40 parts by weight of pellets D22, flame retarder (consisting of 33 parts by weight of component h1 and 11 parts by weight of component j1) and 1 part by weight of lubricant f1 were mixed and blended together by means of Henschel mixer (trade name). The resultant blend was charged into a twin-screw extruder (L/D=45, trade name: KTX-44, manufactured by Kobe Steel, Ltd.), melt kneaded at 200° C. and extruded into pellets of final composition F21. The recipe for obtaining final composition F21 is given in Table 3.

The property evaluation tests (1) to (5) of the obtained pellets of final composition F21 and the sheet specimens therefrom were performed in the same manner as in Example 1. The obtained measurement results are given in Table 4.

Comparative Example 16

The same amount of the same processing stabilizer as in Example 1, 0.5 part by weight of 1,3-bis(t-butylperoxyisopropyl)benzene as a crosslinking agent and 0.5 part by weight of divinylbenzene as a crosslinking auxiliary were added to composition D23 (composition consisting of 50 parts by weight of component A1 and 50 parts by weight of component B6) and blended by means of Henschel mixer (trade name). The resultant blend was charged into a twin-screw extruder (L/D=45, trade name: KTX-44, manufactured by Kobe Steel, Ltd.), melt kneaded and crosslinked at 230° C. and extruded into pellets of crosslinked composition G23.

Flame retarder (consisting of 29 parts by weight of component h1 and 14 parts by weight of component j1) and 1 part by weight of lubricant f1 were added to 100 parts by weight of obtained pellets of crosslinked composition G23 and blended together by means of Henschel mixer (trade name). The resultant blend was charged into a twin-screw extruder (L/D=45, trade name: KTX-44, manufactured by Kobe Steel, Ltd.), melt kneaded at 200° C. and extruded into pellets of final composition F23. The recipe for obtaining final composition F23 is given in Table 3.

The property evaluation tests (1) to (5) of the obtained pellets of final composition F23 and the sheet specimens therefrom were performed in the same manner as in Example 1. The obtained measurement results are given in Table 4.

Comparative Example 17

Composition D24 (composition consisting of 50 parts by weight of component A1 and 50 parts by weight of component B6) and the same amount of the same processing stabilizer as in Example 1 were blended by means of Henschel mixer (trade name). The resultant blend was charged into a twin-screw extruder (L/D=45, trade name: KTX-44, manufactured by Kobe Steel, Ltd.), melt kneaded at 230° C. and extruded into pellets of composition G24.

Flame retarder (consisting of 29 parts by weight of component h1 and 14 parts by weight of component j1) and 1 part by weight of lubricant f1 were added to 100 parts by weight of obtained pellets of composition G24 and simultaneously blended together by means of Henschel mixer (trade name). The resultant blend was charged into a twin-screw extruder (L/D=45, trade name: KTX-44, manufactured by Kobe Steel, Ltd.), melt kneaded at 200° C. and extruded into pellets of final composition F24. The recipe for obtaining final composition F24 is given in Table 3.

The property evaluation tests (1) to (5) of the obtained pellets of final composition F24 and the sheet specimens therefrom were performed in the same manner as in Example 1. The obtained measurement results are given in Table 4.

Comparative Example 18

Composition D25 (composition consisting of 38 parts by weight of component A2, 42 parts by weight of component B6 and 20 parts by weight of component C2) and the same amount of the same processing stabilizer as in Example 1 were blended by means of Henschel mixer (trade name). The resultant blend was charged into a twin-screw extruder (L/D=45, trade name: KTX-44, manufactured by Kobe Steel, Ltd.), melt kneaded at 230° C. and extruded into pellets of composition G25.

Flame retarder (consisting of 38 parts by weight of component h1 and 15 parts by weight of component j1) and 1 part by weight of lubricant f1 were added to 100 parts by weight of obtained pellets of composition G25 and blended together by means of Henschel mixer (trade name). The resultant blend was charged into a twin-screw extruder (L/D=45, trade name: KTX-44, manufactured by Kobe Steel, Ltd.), melt kneaded at 200° C. and extruded into pellets of final composition F25. The recipe for obtaining final composition F25 is given in Table 3.

The property evaluation tests (1) to (5) of the obtained pellets of final composition F25 and the sheet specimens therefrom were performed in the same manner as in Example 1. The obtained measurement results are given in Table 4.

As apparent from Table 4, the respective final compositions F20, F21 and F23 of Comparative Examples 14, 15 and 16 could not simultaneously pass the roll tackiness (1) and tonguing (2), and the breakage resistance during vacuum forming (3), emboss survival ratio (4) and flame resistance (5) of the sheet specimens obtained therefrom.

Also, the respective final compositions F24 and F25 of Comparative Examples 17 and 18 could not simultaneously pass the roll tackiness (1) and tonguing from roll bank (2), and the sheet specimens obtained from the above compositions could not simultaneously pass the breakage resistance during vacuum forming (3), emboss survival ratio (4) and flame resistance (5).

TABLE 1

| Blend and Evaluation | Composition (G) | | | | | | | | | |
|---|---|---|---|---|---|---|---|---|---|---|
| | Polymer Composition (D) | | | | | | | | mineral oil | |
| Experiment No. | T* A | A** wt % | T B | A wt % | T C | A wt % | D | T e | A pbw | |
| Example 1 | A1 | 60 | B1 | 28 | C1 | 12 | D1 | e1 | 20 | |
| 2 | A1 | 50 | B1 | 35 | C1 | 15 | D2 | e1 | 20 | |
| 3 | A1 | 70 | B1 | 21 | C1 | 9 | D3 | e1 | 20 | |
| Comparative 1 | A1 | 40 | B1 | 42 | C1 | 18 | D4 | e1 | 20 | |
| Example 2 | A1 | 80 | B1 | 14 | C1 | 6 | D5 | e1 | 20 | |
| Example 4 | A1 | 60 | B1 | 28 | C1 | 12 | D6 | e1 | 20 | |
| 5 | A1 | 60 | B1 | 28 | C1 | 12 | D7 | e1 | 20 | |
| Comparative 3 | A1 | 60 | B1 | 28 | C1 | 12 | D8 | e1 | 20 | |
| Example 4 | A1 | 60 | B1 | 28 | C1 | 12 | D9 | e1 | 20 | |

| Blend and Evaluation | Final Composition (F) | | | | | | |
|---|---|---|---|---|---|---|---|
| | G | flame retarder composition | | | | lubricant | |
| Experiment No. | 100 pbw | T h | A pbw | T j | A pbw | T f | A pbw | F |
| Example 1 | G1 | h1 | 33 | j1 | 11 | f1 | 1 | F1 |
| 2 | G2 | h1 | 33 | j1 | 11 | f1 | 1 | F2 |
| 3 | G3 | h1 | 33 | j1 | 11 | f1 | 1 | F3 |
| Comparative 1 | G4 | h1 | 33 | j1 | 11 | f1 | 1 | F4 |
| Example 2 | G5 | h1 | 33 | j1 | 11 | f1 | 1 | F5 |
| Example 4 | G6 | h1 | 25 | j1 | 8 | f1 | 1 | F6 |
| 5 | G7 | h1 | 50 | j1 | 17 | f1 | 1 | F7 |
| Comparative 3 | G8 | h1 | 20 | j1 | 4 | f1 | 1 | F8 |
| Example 4 | G9 | h1 | 75 | j1 | 25 | f1 | 1 | F9 |

*: T = Type;
**: A = Amount
pbw: parts by weight.
Use is made of the same marks as in description.

TABLE 2

| Blend and Evaluation | Composition (G) | | | | | | | | | |
|---|---|---|---|---|---|---|---|---|---|---|
| | Polymer Composition (D) | | | | | | | | mineral oil | |
| Experiment No. | T* A | A** wt % | T B | A wt % | T C | A wt % | D | T e | A pbw | |
| Example 6 | A1 | 60 | B1 | 28 | C1 | 12 | D10 | e1 | 20 | |
| 5 | A1 | 60 | B1 | 28 | C1 | 12 | D11 | e1 | 5 | |
| Comparative 6 | A1 | 60 | B1 | 28 | C1 | 12 | D12 | e1 | 40 | |
| Example 7 | A1 | 60 | B1 | 28 | C1 | 12 | D13 | e1 | 20 | |
| 8 | A2 | 60 | B1 | 28 | C1 | 12 | D14 | e1 | 20 | |
| 9 | A1 | 60 | B3 | 28 | C1 | 12 | D15 | e1 | 20 | |
| 10 | A1 | 60 | B4 | 28 | C1 | 12 | D16 | e1 | 20 | |
| 11 | A1 | 60 | B5 | 28 | C1 | 12 | D17 | e1 | 20 | |
| 12 | A1 | 60 | B1 | 28 | C2 | 12 | D18 | e1 | 20 | |
| 13 | A1 | 60 | B1 | 28 | C3 | 12 | D19 | e1 | 20 | |

| Blend and Evaluation | Final Composition (F) | | | | | | |
|---|---|---|---|---|---|---|---|
| | G | flame retarder composition | | | | lubricant | |
| Experiment No. | 100 pbw | T h | A pbw | T j | A pbw | T f | A pbw | F |
| Example 6 | G10 | h1 | 33 | j1 | 11 | f1 | 1 | F10 |
| 5 | G11 | h1 | 33 | j1 | 11 | f1 | 1 | F11 |
| Comparative 6 | G12 | h1 | 33 | j1 | 11 | f1 | 1 | F12 |
| Example 7 | G13 | h1 | 33 | j1 | 11 | — | 0 | F13 |
| 8 | G14 | h1 | 33 | j1 | 11 | f1 | 1 | F14 |
| 9 | G15 | h1 | 33 | j1 | 11 | f1 | 1 | F15 |
| 10 | G16 | h1 | 33 | j1 | 11 | f1 | 1 | F16 |
| 11 | G17 | h1 | 33 | j1 | 11 | f1 | 1 | F17 |
| 12 | G18 | h1 | 33 | j1 | 11 | f1 | 1 | F18 |
| 13 | G19 | h1 | 33 | j1 | 11 | f1 | 1 | F19 |

*: T = Type;
**: A = Amount
pbw: parts by weight.
Use is made of the same marks as in description.

TABLE 3

| Blend & Evaluation | Composition (G) | | | | | | | | | | | crosslinking agent |
|---|---|---|---|---|---|---|---|---|---|---|---|---|
| | Polymer Composition (D) | | | | | | | | mineral oil | | | |
| | A | | | | | | | | | | | |
| Exp. No. | T* A | A** wt % | T B | wt % | T C | A wt % | D type | T e | A pbw | *** pbw | | |
| Comp. Example 14 | A1 | 70 | B3 | 15 | C' C1 | 15 100 | D20 — | e2 — | 30 — | 0.5 — | | |
| 15 | A1 | 80 | B3 | 20 | — | — | D21 | e2 | 30 | 0.5 | | |
| | A1 | 50 | B3 | 50 | — | — | D22 | — | — | 0.5 | | |
| 16 | A1 | 50 | B6 | 50 | C1 | — | D23 | — | — | 1 | | |
| 17 | A1 | 50 | B6 | 50 | C1 | — | D24 | — | — | — | | |
| 18 | A2 | 38 | B6 | 42 | C2 | 20 | D25 | — | — | — | | |

| Blend and Evaluation | Final Composition (F) | | | | | | | |
|---|---|---|---|---|---|---|---|---|
| | compsn. G | | flame retarder composition | | | | lubricant | |
| Experiment No. | T G | A pbw | T h | A pbw | T j | A pbw | T f | A pbw | F |
| Comparative 14 | G20 C1 | 77 23 | h1 | 33 | j1 | 11 | f1 | 1 | F20 |
| Example 15 | G21 G22 | 60 40 | h1 | 33 | j1 | 11 | f1 | 1 | F21 |
| 16 | G23 | 100 | h1 | 29 | j1 | 14 | f1 | 1 | F23 |
| 17 | G24 | 100 | h1 | 29 | j1 | 14 | f1 | 1 | F24 |
| 18 | G25 | 100 | h1 | 38 | j1 | 15 | f1 | 1 | F25 |

*: T = Type,
**: A = Amount
pbw: parts by weight:
Use is made of the same marks as in description: F22 is absent
***: The crosslinking agent is a 1:1 by weight mixture of 1,3-bis(t-butylperoxyisopropyl)benzene and p-divinylbenzene.

TABLE 4

| Properties of test piece Experiment NO. | Tackiness onto roll | Tonguing from bank on roll | Mold breakage resistance at vac. forming | Emboss survival ratio (%) | Burning vel. mm/min |
|---|---|---|---|---|---|
| Example 1 | AA | AA | AA | BB | 0 |
| 2 | BB | AA | AA | AA | 0 |
| 3 | AA | BB | BB | BB | 0 |
| Comparative 1 | DD | AA | — | — | — |
| Example 2 | BB | DD | CC | CC | 0 |
| Example 4 | AA | AA | AA | BB | 70 |
| 5 | BB | BB | BB | AA | 0 |
| Comparative 3 | AA | AA | AA | BB | 120 |
| Example 4 | DD | CC | — | — | — |
| Example 6 | AA | AA | AA | BB | 0 |
| 5 | DD | CC | — | — | 0 |
| 6 | BB | AA | BB | CC | 140 |
| 7 | CC | BB | AA | BB | 0 |
| 8 | DD | AA | — | — | — |

TABLE 4-continued

| Properties of test piece Experiment NO. | | Tackiness onto roll | Tonguing from bank on roll | Mold breakage resistance at vac. forming | Emboss survival ratio (%) | Burning vel. mm/min |
| --- | --- | --- | --- | --- | --- | --- |
| Comparative Example | 9 | CC | BB | DD | AA | 0 |
| | 10 | CC | BB | CC | AA | 0 |
| | 11 | AA | AA | AA | CC | 0 |
| | 12 | AA | AA | DD | AA | 0 |
| | 13 | CC | AA | BB | BB | 0 |
| | 14 | AA | CC | DD | BB | 0 |
| | 15 | BB | CC | DD | BB | 0 |
| | 16 | CC | BB | DD | BB | 0 |
| | 17 | CC | BB | CC | BB | 0 |
| | 18 | DD | BB | — | — | — |

What is claimed is:

1. A nonflammable olefin thermoplastic elastomer composition for use in skins of interior automotive trim, which comprises:

an oil-extended olefin thermoplastic elastomer composition (G) comprising 100 parts by weight of an olefin thermoplastic elastomer composition (D) which comprises 50 to 70% by weight of an ethylene/α-olefin copolymer elastomer (A) having a Mooney viscosity (ML1+4(100° C.)) of 40 to 100, 21 to 35% by weight of a polypropylene resin (B) having a crystal melting point of 140° to 165° C. and an ethylene unit content of 1 to 2% by weight, and 9 to 15% by weight of a low-density polyethylene resin (C) having a density of 0.90 to 0.93 g/cm$^3$ and a crystal melting point of 102°–118° C., and 10 to 30 parts by weight of a mineral oil (e); and, relative to 100 parts by weight of the oil-extended olefin thermoplastic elastomer composition (G), 25 to 50 parts by weight of melamine-coated ammonium polyphosphate (h), 8 to 17 parts by weight of a 1,3,5-triazine derivative (j) having a chemical structure represented by the general formula:

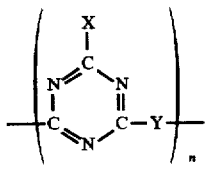

(I)

wherein X represents a morpholino or piperidino group, Y represents a divalent group derived from piperazine and n is equal to or greater than 1, and 0.1 to 3 parts by weight of a lubricant (f).

2. The nonflammable olefin thermoplastic elastomer composition as claimed in claim 1, wherein the polypropylene resin (B) is a propylene polymer composition comprising a crystalline propylene/ethylene copolymer or a crystalline propylene homopolymer and a propylene/ethylene copolymer having an ethylene unit content of 0.5 to 4% by weight, the propylene polymer composition in its entirety having an ethylene unit content of 1 to 2% by weight.

3. The nonflammable olefin thermoplastic elastomer composition as claimed in claim 1, wherein 15 to 25 parts by weight of the mineral oil (e) is contained per 100 parts by weight of the olefin thermoplastic elastomer composition (D).

4. The nonflammable olefin thermoplastic elastomer composition as claimed in claim 1, wherein 0.5 to 2 parts by weight of the lubricant (f) is contained per 100 parts by weight of the oil-extended olefin thermoplastic elastomer composition (G).

5. The nonflammable olefin thermoplastic elastomer composition as claimed claim 1, wherein 28 to 40 parts by weight of the melamine-coated ammonium polyphosphate (h) is contained per 100 parts by weight of the oil-extended olefin thermoplastic elastomer composition (G).

6. A laminate for use as a skin of interior automotive trim, comprising a foamed polyolefin resin sheet and a flame-resistant sheet of the nonflammable olefin thermoplastic elastomer composition as claimed in claim 1.

7. The laminate for use as a skin of interior automotive trim as claimed in claim 6, wherein the foamed polyolefin resin sheet has an expansion ratio of 20 to 30 and an average thickness of 1 to 3 mm and the flame-resistant sheet has an average thickness of 0.25 to 0.45 mm.

8. The nonflammable olefin thermoplastic elastomer composition as claimed in claim 2, wherein 15 to 25 parts by weight of the mineral oil (e) is contained per 100 parts by weight of the olefin thermoplastic elastomer composition (D).

9. The nonflammable olefin thermoplastic elastomer composition as claimed in claim 2, wherein 0.5 to 2 parts by weight of the lubricant (f) is contained per 100 parts by weight of the oil-extended olefin thermoplastic elastomer composition (G).

10. The nonflammable olefin thermoplastic elastomer composition as claimed in claim 3, wherein 0.5 to 2 parts by weight of the lubricant (f) is contained per 100 parts by weight of the oil-extended olefin thermoplastic elastomer composition (G).

11. The nonflammable olefin thermoplastic elastomer composition as claimed in claim 2 wherein 28 to 40 parts by weight of the melamine-coated ammonium polyphosphate (h) is contained per 100 parts by weight of the oil-extended olefin thermoplastic elastomer composition (G).

12. The nonflammable olefin thermoplastic elastomer composition as claimed in claim 3 wherein 28 to 40 parts by weight of the melamine-coated ammonium polyphosphate (h) is contained per 100 parts by weight of the oil-extended olefin thermoplastic elastomer composition (G).

13. The nonflammable olefin thermoplastic elastomer composition as claimed in claim 4 wherein 28 to 40 parts by weight of the melamine-coated ammonium polyphosphate (h) is contained per 100 parts by weight of the oil-extended olefin thermoplastic elastomer composition (G).

14. A laminate for use as a skin of interior automotive trim, comprising a foamed polyolefin resin sheet and a flame-resistant sheet of nonflammable olefin thermoplastic elastomer composition as claimed in claim 2.

15. A laminate for use as a skin of interior automotive trim, comprising a foamed polyolefin resin sheet and a flame-resistant sheet of nonflammable olefin thermoplastic elastomer composition as claimed in claim 3.

16. A laminate for use as a skin of interior automotive trim, comprising a foamed polyolefin resin sheet and a flame-resistant sheet of nonflammable olefin thermoplastic elastomer composition as claimed in claim 4.

17. A laminate for use as a skin of interior automotive trim, comprising a foamed polyolefin resin sheet and a flame-resistant sheet of nonflammable olefin thermoplastic elastomer composition as claimed in claim 5.

18. The laminate for use as a skin of interior automotive trim as claimed in claim 14, wherein the formed polyolefin resin sheet has an expansion ratio of 20 to 30 and an average thickness of 1 to 3 mm and the flame-resistant sheet has an average thickness of 0.25 to 0.45 mm.

19. The laminate for use as a skin of interior automotive trim as claimed in claim 15, wherein the formed polyolefin resin sheet has an expansion ratio of 20 to 30 and an average thickness of 1 to 3 mm and the flame-resistant sheet has an average thickness of 0.25 to 0.45 mm.

20. The laminate for use as a skin of interior automotive trim as claimed in claim 16, wherein the formed polyolefin resin sheet has an expansion ratio of 20 to 30 and an average thickness of 1 to 3 mm and the flame-resistant sheet has an average thickness of 0.25 to 0.45 mm.

* * * * *